United States Patent
Abbondanzio et al.

(10) Patent No.: US 8,694,992 B2
(45) Date of Patent: Apr. 8, 2014

(54) TRAVERSING MEMORY STRUCTURES TO PARSE GUEST OPERATING SYSTEM INSTRUMENTATION INFORMATION IN A HYPERVISOR

(75) Inventors: Antonio Abbondanzio, Raleigh, NC (US); Robert B. Basham, Aloha, OR (US); Michael D. Day, II, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 616 days.

(21) Appl. No.: 12/969,864

(22) Filed: Dec. 16, 2010

(65) Prior Publication Data

US 2012/0159475 A1 Jun. 21, 2012

(51) Int. Cl.
*G06F 9/455* (2006.01)
*G06F 9/44* (2006.01)

(52) U.S. Cl.
USPC ............. 718/1; 717/120; 717/127; 717/130

(58) Field of Classification Search
None
See application file for complete search history.

(56) References Cited

U.S. PATENT DOCUMENTS

| 7,657,659 | B1 | 2/2010 | Lambeth et al. |
|---|---|---|---|
| 2009/0164990 | A1 | 6/2009 | Ben-Yehuda et al. |
| 2009/0327576 | A1 | 12/2009 | Oshins |
| 2009/0328074 | A1 | 12/2009 | Oshins |
| 2012/0084381 | A1* | 4/2012 | Alladi et al. ................ 718/1 |

OTHER PUBLICATIONS

Microsoft; Managing Virtual Server; retrieved from Technet by Google on Oct. 27, 2004 from www.google.com/search?num=50 &newwindow=1&rls=com.microsoft%3Aen-us%3AIE-SearchBox &biw=1224&bih=847&tbs=cdr%3A1%2Ccd_min%3AJan.+ 2004%2Ccd_max%3AJan.+2006&q=Managing+Virtual+Server &oq=Managing+Virtual+Server&gs_l=serp.12..0j0i22i30l7.1147. 1147.0.2795.1.1.0.*
Menon et al.; "TwinDrivers: Semi-Automatic Derivation Of Fast and Safe Hypervisor Network Drivers From Guest OS Drivers"; INSPEC/ACM; vol. 44, No. 3 pp. 301-312; Mar. 2009.
Raj, H.; "Virtualization Services: Scalable Methods for Virtualizing Multicore Systems"; DIALOG/Dissertation Abstracts International; vol. 69; No. 4; 2008.
Rosenblum et al., "Virtual Machine-Provided Context Sensitive Page Mappings"; ACM Digital Library; pp. 81-92; Mar. 2008.
Jones et al., "Geiger: Monitoring The Buffer Cache In A Virtual Machine Environment"; ACM Digital Library; pp. 14-24; Oct. 2006.

* cited by examiner

*Primary Examiner* — Abdullah Al Kawsar
*Assistant Examiner* — Bing Zhao
(74) *Attorney, Agent, or Firm* — Brandon C. Kennedy; Thomas E. Tyson; Biggers Kennedy Lenart Spraggins LLP

(57) ABSTRACT

Methods, apparatuses, and computer program products are provided for acquiring guest operating system instrumentation information in a hypervisor. Embodiments include receiving from a platform management application, by a hypervisor communication module of the hypervisor, a platform request for guest operating system instrumentation information associated with at least one guest operating system executing within the hypervisor; in response to receiving the platform request for the guest operating system instrumentation information, retrieving through shared memory between the hypervisor and the guest operating system, by the hypervisor communication module, the guest operating system instrumentation information associated with the at least one guest operating system; and transmitting, by the hypervisor communication module, the guest operating system instrumentation information to the platform management application.

14 Claims, 6 Drawing Sheets

TRAVERSING MEMORY STRUCTURES TO PARSE GUEST OPERATING SYSTEM INSTRUMENTATION INFORMATION IN A HYPERVISOR

BACKGROUND OF THE INVENTION

1. Field of the Invention

The field of the invention is data processing, or, more specifically, methods, apparatus, and products for acquiring guest operating system instrumentation information in a hypervisor.

2. Description of Related Art

In a virtualized server environment, a hypervisor, also called a virtual machine monitor (VMM) may be used to enable multiple guest operating systems to run concurrently on one or more server computers. A hypervisor presents to guest operating systems a virtual operating platform and monitors the execution of the guest operating systems. Multiple instances of a variety of guest operating systems may share the virtualized hardware resources of the server computers. A platform management application is often used to monitor and control the allocation of resources among the server computers. Because each guest operating system in the virtualized server environment represents and uses resources of the overall system, the platform management applications are interested in information about each guest operating system.

SUMMARY OF THE INVENTION

Methods, apparatuses, and computer program products are provided for acquiring guest operating system instrumentation information in a hypervisor. Embodiments include receiving from a platform management application, by a hypervisor communication module of the hypervisor, a platform request for guest operating system instrumentation information associated with at least one guest operating system executing within the hypervisor; in response to receiving the platform request for the guest operating system instrumentation information, retrieving through shared memory between the hypervisor and the guest operating system, by the hypervisor communication module, the guest operating system instrumentation information associated with the at least one guest operating system; and transmitting, by the hypervisor communication module, the guest operating system instrumentation information to the platform management application.

The foregoing and other objects, features and advantages of the invention will be apparent from the following more particular descriptions of example embodiments of the invention as illustrated in the accompanying drawings wherein like reference numbers generally represent like parts of example embodiments of the invention.

DETAILED DESCRIPTION OF EXAMPLE EMBODIMENTS

Figure 1:
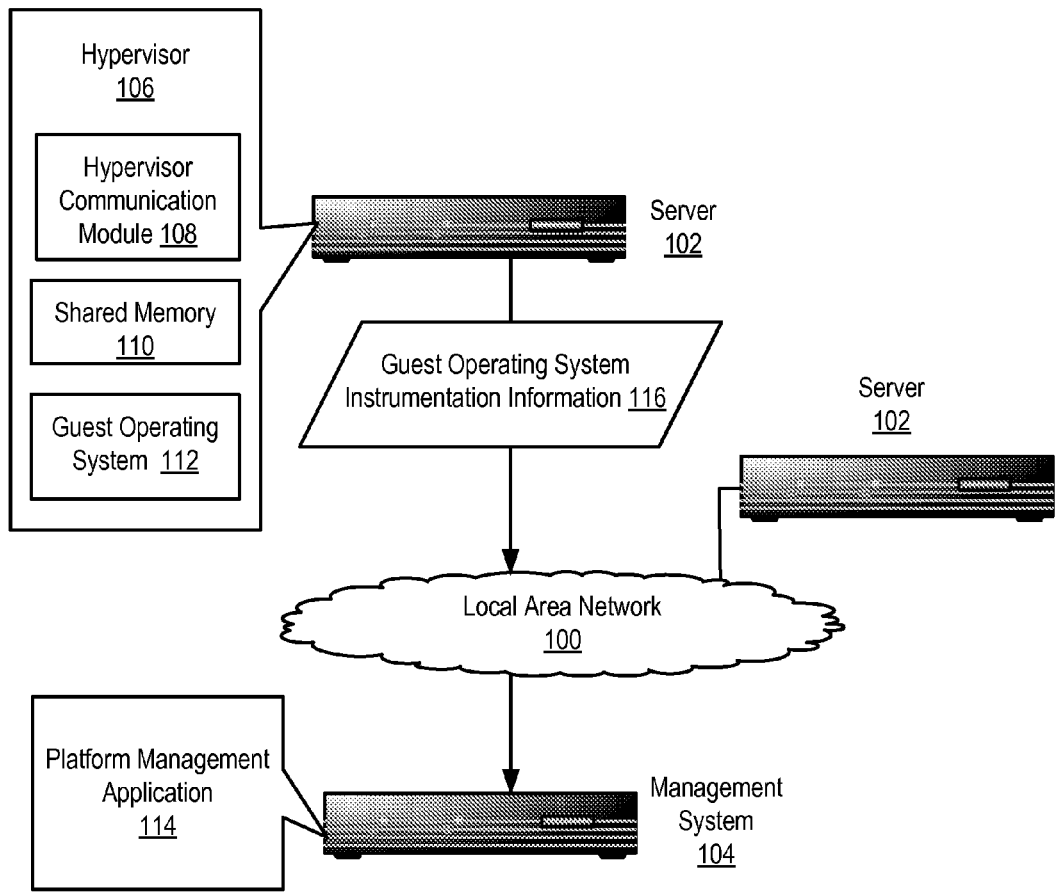
FIG. 1 sets forth a network diagram of a system for acquiring guest operating system instrumentation information in a hypervisor according to embodiments of the present invention.

Example methods, apparatuses, and products for acquiring guest operating system instrumentation information in a hypervisor in accordance with the present invention are described with reference to the accompanying drawings, beginning with FIG. 1. FIG. 1 sets forth a network diagram of a system for acquiring guest operating system instrumentation information in a hypervisor according to embodiments of the present invention. The system of FIG. 1 is a virtualized server environment that includes a plurality of computer servers (102) and a management system (104) coupled together through a local area network (100).

The management system (104) of FIG. 1 includes a platform management application (114) that is configured to monitor the resources of the plurality of servers (102). The resources of the plurality of servers (102) may include memory, processors, and data storage. The platform management application (114) may also be configured to control allocation of the resources of the plurality of servers (102) based on guest operating system instrumentation information. Guest operating system instrumentation information may include resource usage, significant events, running processes, open files, and configuration changes of the guest operating systems (112) that are running on the servers (102). The platform management application (114) may acquire the guest operating system instrumentation information by transmitting to a hypervisor (106) within a server (102) a platform request for the guest operating system instrumentation information.

The hypervisor (106) of FIG. 1 is configured to provide a virtualized operating system platform that enables the guest operating systems (112) to run concurrently on one or more of the servers (102). Each server (102) may include a hypervisor or one hypervisor on a server (102) may provide the virtualized operating system platform for a plurality of guest operating systems (112) running on a plurality of servers (102). The hypervisor (106) of FIG. 1 includes a hypervisor communication module (108), shared memory (110), and a guest operating system (112). The hypervisor (106) may be configured to support multiple guest operating systems (112). Within the hypervisor (106) each guest operating system (112) may share one or more pages of shared memory (110) with the hypervisor (106). The shared memory (110) of FIG. 1 may include guest operating system instrumentation information associated with a particular guest operating system (112).

The hypervisor communication module (108) of FIG. 1 is configured to receive from the platform management application (114), platform requests for the guest operating system instrumentation information. In response to receiving a platform request for the guest operating system instrumentation information, the hypervisor communication module (108) is configured to retrieve the guest operating system instrumentation information associated with the guest operating system (112) corresponding with the platform request. The hypervisor communication module (108) may retrieve the guest operating system instrumentation information through the shared memory (110) and transmit the guest operating system instrumentation information to the platform management application (114). By configuring the hypervisor communication module (108) to retrieve the guest operating instrumentation information through the shared memory (110) and transmit the guest operating system instrumentation information to the platform management application (114), the platform management application does not have to directly request the guest operating system instrumentation information from the guest operating system (112). Preventing direct platform requests from the platform management application (114) to the guest operating systems (112), enables the guest operating system (112) to execute without responding to inquires from the platform management application (114).

The arrangement of servers and other devices making up the example system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Acquiring guest operating system instrumentation information in a hypervisor in accordance with the present invention is generally implemented with computers, that is, with automated computing machinery. In the system of FIG. 1, for example, all the hypervisor (106), the hypervisor communication module (108), the shared memory (110), the guest operating system (112), the platform management application (114), the management system (104), the servers (102), and the local area network (100) are implemented to some extent at least as computers. For further explanation, therefore, FIG. 2 sets forth a block diagram of automated computing machinery comprising an example computer (252) useful in acquiring guest operating system instrumentation information in a hypervisor according to embodiments of the present invention. The computer (252) of FIG. 2 includes at least one computer processor (256) or 'CPU' as well as random access memory (268) ('RAM') which is connected through a high speed memory bus (266) and a bus adapter (258) to the processor (256) and to other components of the computer (252).

Stored in RAM (168) is the hypervisor (106) which includes the hypervisor communication module (108), the shared memory (110), and the guest operating systems (112). The hypervisor communication module (108) includes computer program instructions that when executed by the computer processor (256), cause the computer processor (256) to: receive from a platform management application (114), by the hypervisor communication module (108) of the hypervisor (106), a platform request for guest operating system instrumentation information associated with at least one guest operating system (112) executing within the hypervisor (108); in response to receiving the platform request for the guest operating system instrumentation information, retrieve through the shared memory (110) between the hypervisor (106) and the guest operating system (112), by the hypervisor communication module (108), the guest operating system instrumentation information associated with the at least one guest operating system (112); and transmit, by the hypervisor communication module (108), the guest operating system instrumentation information to the platform management application (114).

The hypervisor communication module (108) and the platform management application (114) each include an adapter (194, 295) for communicating with each other. The adapter (295) in the hypervisor communication module (108) is configured to translate information received from the platform management application (114) into a data format that the hypervisor communication module (108) uses and to translate information received from the hypervisor communication module (108) into a format for transmission to the platform management application. The adapter (294) in the platform management application (114) translates information received from the hypervisor communication module (108) into a format that the platform management application (114) uses and translates information received from the platform management application (114) into a format for transmission to the hypervisor communication module (108). The adapters (294, 295) of FIG. 2 may include Red Hat Enterprise Virtualization Hypervisor (RHEV-H) and virtual input/output server (VIOS) adapters.

Also stored in RAM (268) is an operating system (254). Operating systems useful acquiring guest operating system instrumentation information in a hypervisor according to embodiments of the present invention include UNIX™, Linux™, Microsoft XP™, AIX™, IBM's i5/OS™, and others as will occur to those of skill in the art. The operating system (254), the hypervisor (106), the hypervisor communication module (108), the shared memory (110), and the guest operating systems (112) in the example of FIG. 2 are shown in RAM (268), but many components of such software typically are stored in non-volatile memory also, such as, for example, on a data storage device (270), such as a disk drive.

Figure 2:
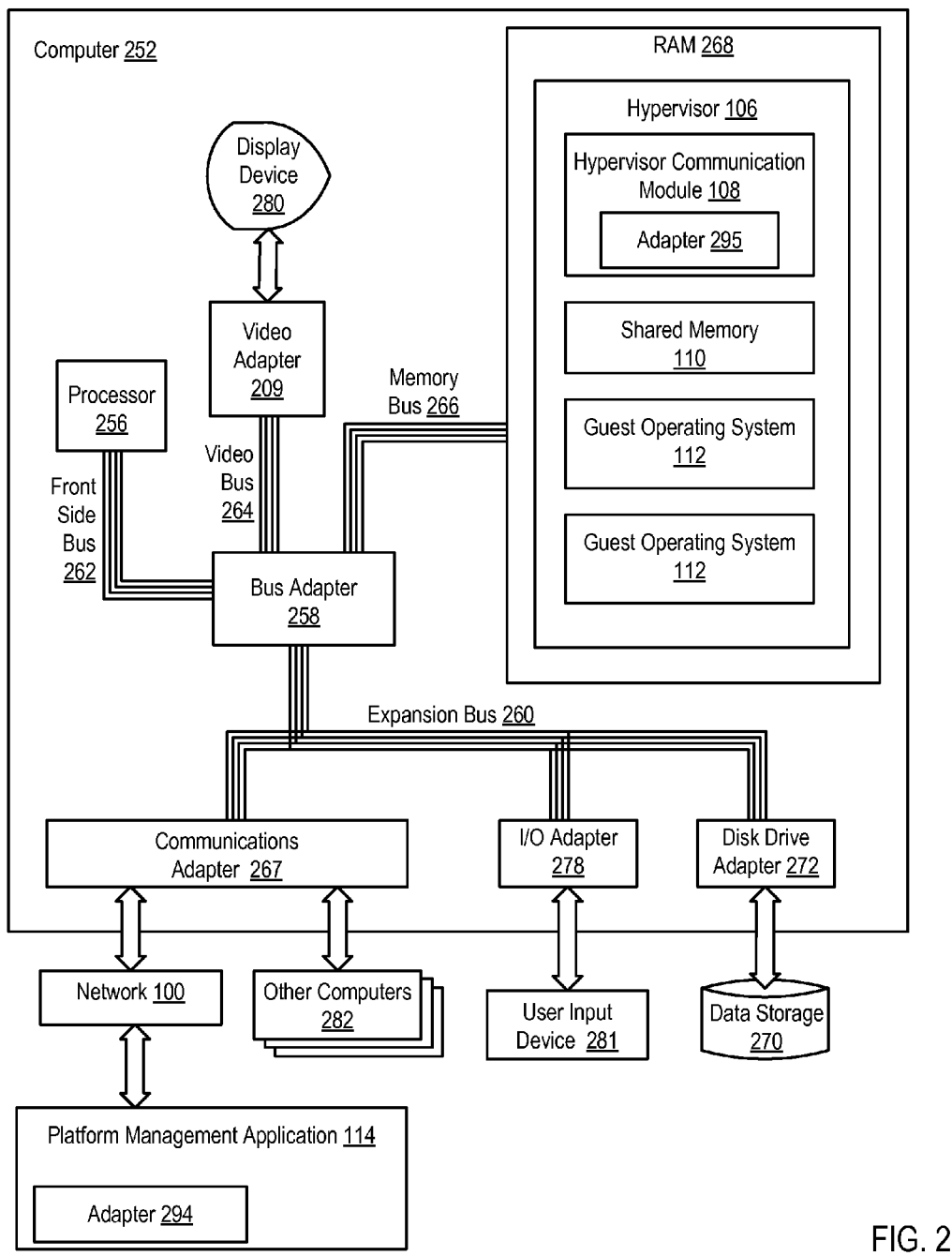
FIG. 2 sets forth a block diagram of automated computing machinery comprising an example computer useful in acquiring guest operating system instrumentation information in a hypervisor according to embodiments of the present invention FIG. 3 sets forth a block diagram of automated computing machinery comprising another example computer useful in acquiring guest operating system instrumentation information in a hypervisor according to embodiments of the present invention FIG. 4 sets forth a flow chart illustrating an example of a method for acquiring guest operating system instrumentation information in a hypervisor according to embodiments of the present invention FIG. 5 sets forth a flow chart illustrating a further example of a method for acquiring guest operating system instrumentation information in a hypervisor according to embodiments of the present invention.

The computer (252) of FIG. 2 includes disk drive adapter (272) coupled through expansion bus (260) and bus adapter (258) to the computer processor (256) and other components of the computer (252). Disk drive adapter (272) connects non-volatile data storage to the computer (252) in the form of the disk drive (270). Disk drive adapters useful in computers for acquiring guest operating system instrumentation information in a hypervisor (106) according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (252) of FIG. 2 includes one or more input/output ('I/O') adapters (278). I/O adapters implement user-oriented input/output through, for example, software drivers and computer hardware for controlling output to display devices such as computer display screens, as well as user input from user input devices (281) such as keyboards and mice. The example computer (252) of FIG. 2 includes a video adapter (209), which is an example of an I/O adapter specially designed for graphic output to a display device (280) such as a display screen or computer monitor. Video adapter (209) is connected to the computer processor (256) through a high speed video bus (264), bus adapter (258), and the front side bus (262), which is also a high speed bus.

The example computer (252) of FIG. 2 includes a communications adapter (267) for data communications with other computers (282) and for data communications with the platform management application (114) through a data communications network (100). Such data communications may be carried out serially through RS-232 connections, through external buses such as a Universal Serial Bus ('USB'), through data communications data communications networks such as IP data communications networks, and in other ways as will occur to those of skill in the art. Communications adapters implement the hardware level of data communications through which one computer sends data communications to another computer, directly or through a data communications network. Examples of communications adapters useful for acquiring guest operating system instrumentation information in a hypervisor according to embodiments of the present invention include modems for wired dial-up communications, Ethernet (IEEE 802.3) adapters for wired data communications network communications, and 802.11 adapters for wireless data communications network communications.

Figure 3:
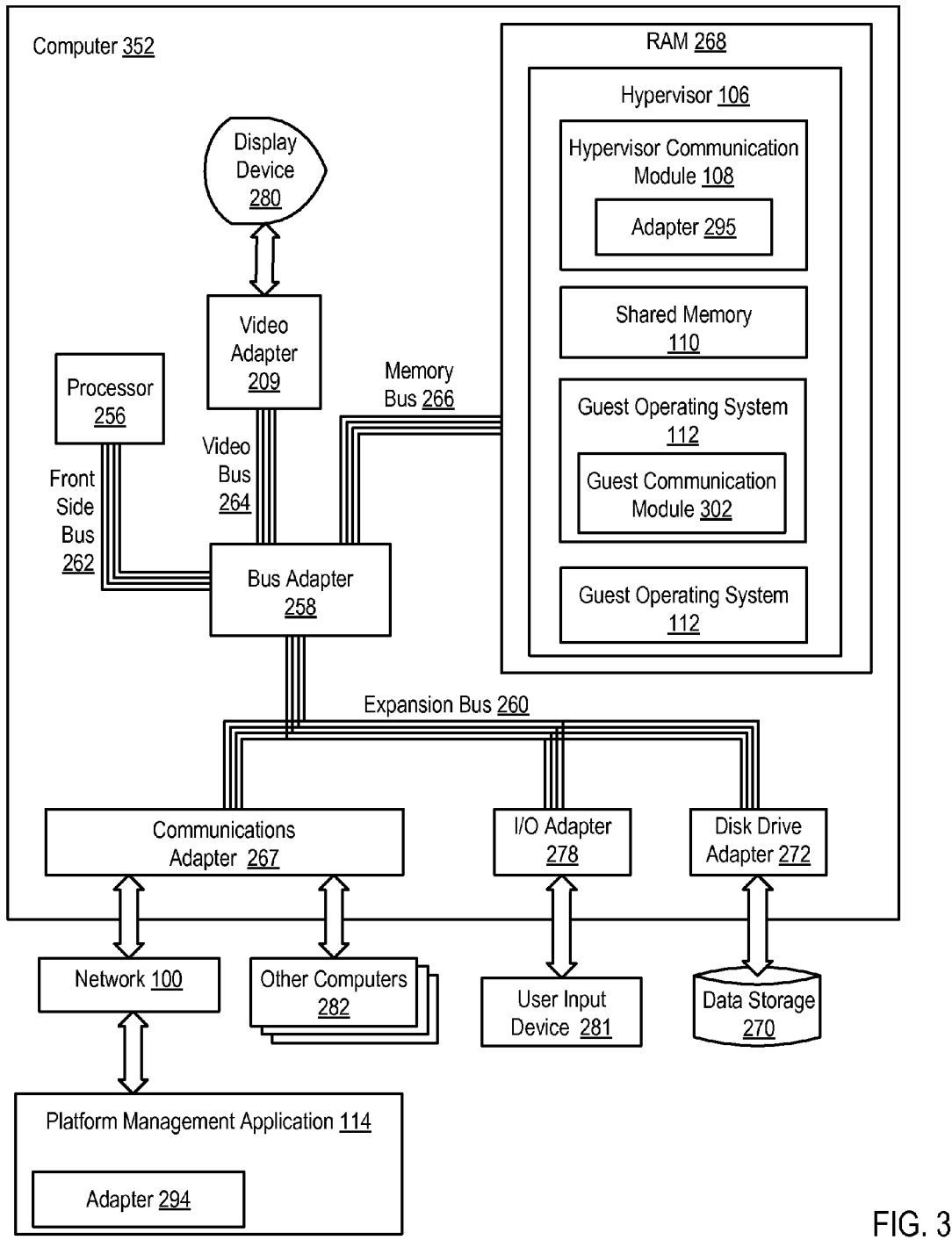

FIG. 3 sets forth a block diagram of automated computing machinery comprising another example computer (352) useful in acquiring guest operating system instrumentation information in a hypervisor according to embodiments of the present invention. The computer (352) of FIG. 3 includes the following components of the example computer (252) of FIG. 2: the processor (256), the video adapter (209), the bus adapter (258), the display device (280), the front side bus (262), the video bus (264), the memory bus (266), the expansion bus (260), the communications adapter (267), the I/O adapter (278), the disk drive adapter (272), the RAM (268), the hypervisor (106), the hypervisor communication module (108), the hypervisor adapter (295), the shared memory (110), the guest operating systems (112).

The example computer (352) of FIG. 3 differs from the computer (252) of FIG. 2 with the inclusion of a guest communication module (302) within one of the guest operating systems (112). The guest communication module (302) includes computer program instructions that when executed by the computer processor (256) cause the computer processor (256) to receive a hypervisor request for guest operating system instrumentation information; identify the guest operating system instrumentation information; and transmit the guest operating system instrumentation information to the hypervisor communication module (108).

The hypervisor communication module (108) of FIG. 3 includes computer program instructions that when executed by the computer processor (256) cause the computer processor (256) to transmit through the shared memory (110), by the hypervisor communication module (108) to the guest communication module (302) a hypervisor request for the guest operating system instrumentation information; and receive, through the shared memory (110) from the guest communication module (302), by the hypervisor communication module (108), the guest operating system instrumentation information.

Figure 4:
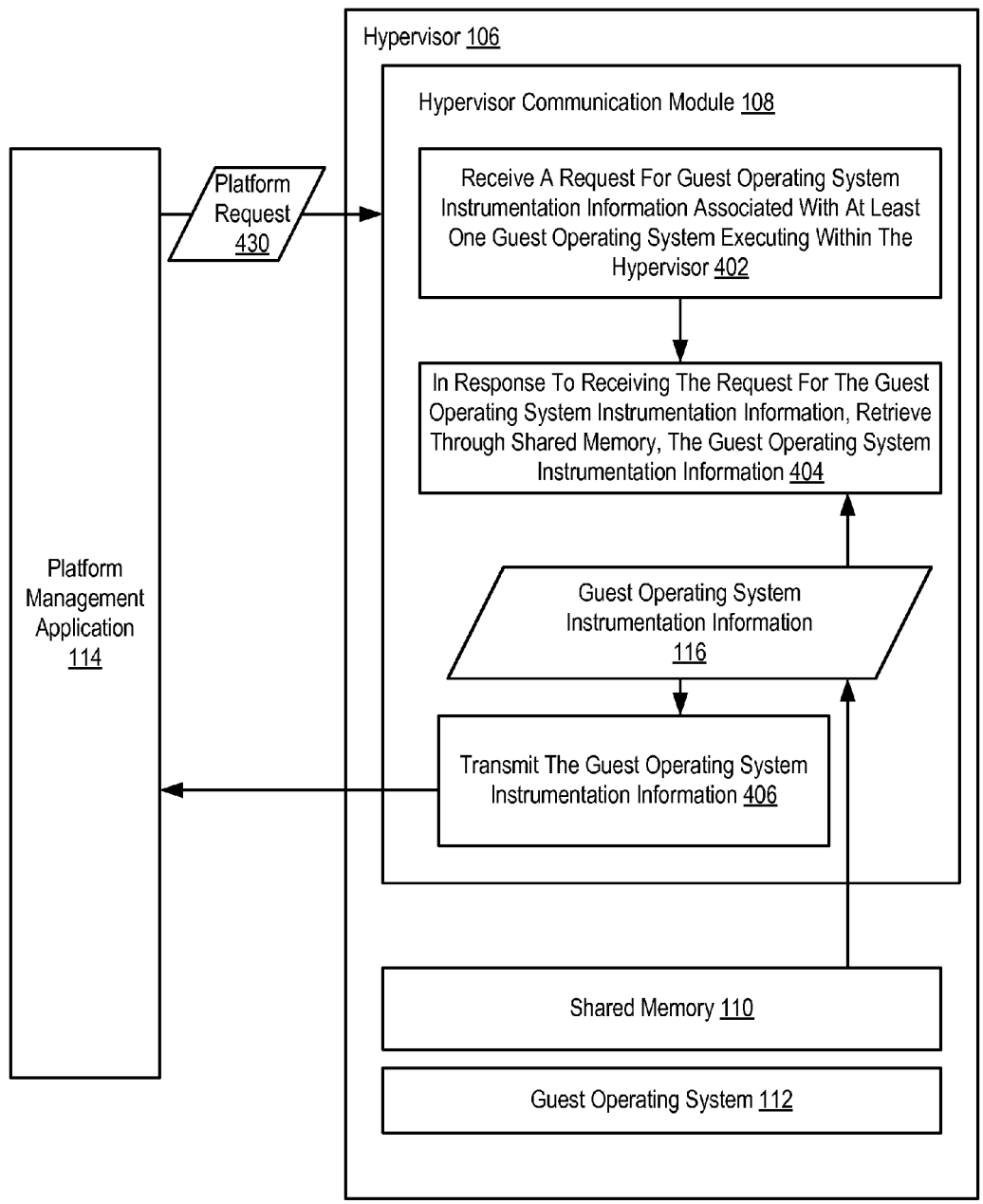

For further explanation, FIG. 4 sets forth a flow chart illustrating an example of a method for acquiring guest operating system instrumentation information in a hypervisor according to embodiments of the present invention. The method of FIG. 4 includes receiving (402) from a platform management application (114), by a hypervisor communication module (108) of a hypervisor (106), a platform request (430) for guest operating system instrumentation information (116) associated with at least one guest operating system (112) executing within the hypervisor (106). Receiving (402) a platform request (430) for guest operating system instrumentation information (116) may be carried out by establishing a connection between the platform management application (114) and the hypervisor communication module (108) through communication adapters; translating information at the adapters; and transmitting the translated information to the hypervisor communication module (108).

The method of FIG. 4 also includes in response to receiving (402) the platform request (430) for the guest operating system instrumentation information (116), retrieving (404) through shared memory (110) between the hypervisor (106) and the guest operating system (112), by the hypervisor communication module (108), the guest operating system instrumentation information (116) associated with the at least one guest operating system (112). Retrieving (404) the guest operating system instrumentation information (116) may be carried out by using an instrospection technique that includes examining predetermined locations in the shared memory (110) for the guest operating system instrumentation information; and using a monitoring technique that includes the hypervisor communication module (108) requesting the guest operating system instrumentation information from one or more guest operating system (112).

The method of FIG. 4 includes transmitting (406), by the hypervisor communication module (108), the guest operating system instrumentation information (116) to the platform management application (114). Transmitting (406) the guest operating system instrumentation information (116) may be carried out by establishing a connection between the platform management application (114) through communication adapters within the platform management application and the hypervisor communication module (108), translating information at the adapters, and transmitting the translated information to the platform management application (114).

Figure 5:
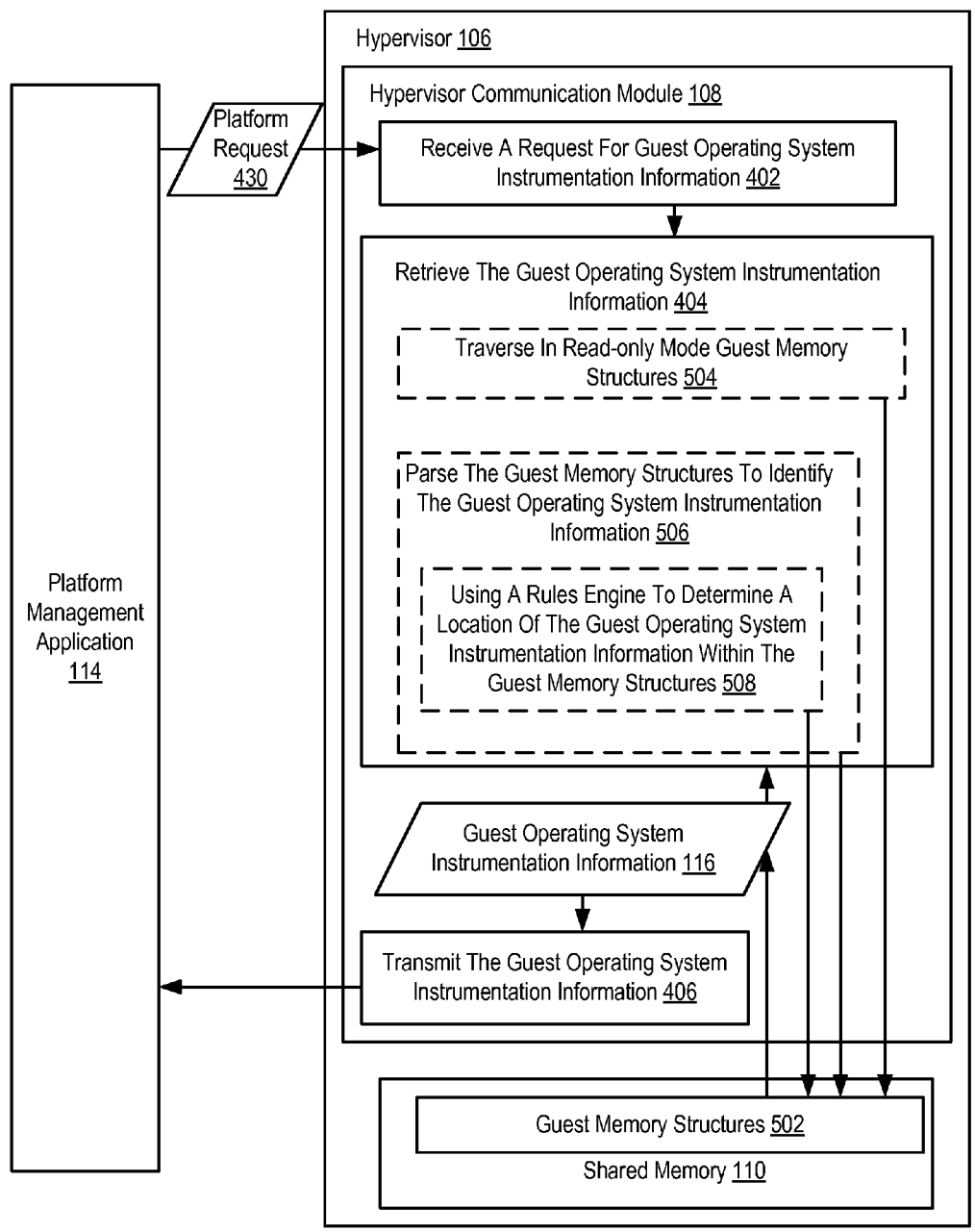

For further explanation, FIG. 5 sets forth a flow chart illustrating a further example of a method for acquiring guest operating system instrumentation information in a hypervisor according to embodiments of the present invention. The method of FIG. 5 may be considered an introspective technique for retrieving the guest operating system instrumentation information. An instrospective technique may include the hypervisor (106) examining the shared memory (110) of the guest operating system to identify the guest operating system instrumentation information. The method of FIG. 5 includes the following elements of the method of FIG. 4: receiving (402) from a platform management application (114), by a hypervisor communication module (108) of a hypervisor (106), a platform request (430) for guest operating system instrumentation information (116) associated with at least one guest operating system (112) executing within the hypervisor (106); and in response to receiving (402) the platform request (430) for the guest operating system instrumentation information (116), retrieving (404) through shared memory (110) between the hypervisor (106) and the guest operating system (112), by the hypervisor communication module (108), the guest operating system instrumentation information (116) associated with the at least one guest operating system (112).

The elements of FIG. 5 that differ from the method of FIG. 4 are illustrated in FIG. 5 with a dashed line. More particularly, those elements include: traversing (504) in a read-only mode, by the hypervisor communication module (108), guest memory structures (502) associated with the at least one guest operating system (112); parsing (506) the guest memory structures (502) to identify the guest operating system instrumentation information (116); and parsing (506) the guest memory structures (502) to identify the guest operating system instrumentation information (116) includes using (508) a rules engine to determine a location of the guest operating system instrumentation information (116) within the guest memory structures (502).

In the method of FIG. 5, retrieving (404) the guest operating system instrumentation information (116) includes traversing (504) in a read-only mode, by the hypervisor communication module (108), guest memory structures (502) associated with the at least one guest operating system (112). Traversing (504) in a read-only mode the guest memory structures (502) may be carried out by examining parameters within the guest memory structures (502), retrieving data associated with parameters within the guest memory structures (502), and storing the data in the hypervisor communication module (108).

In the method of FIG. 5, retrieving (404) the guest operating system instrumentation information (116) includes parsing (506) the guest memory structures (502) to identify the guest operating system instrumentation information (116). Parsing (506) the guest memory structures may be carried out by categorizing data retrieved from parameters within the guest memory structures (502) and associating the data retrieved from parameters within the guest memory structures (502) with elements of the guest operating system instrumentation information.

Parsing (506) the guest memory structures (502) to identify the guest operating system instrumentation information (116) may include using (508) a rules engine to determine a location of the guest operating system instrumentation information (116) within the guest memory structures (502). Using (508) the rules engine to determine a location of the guest operating system instrumentation information (116) may be carried out by searching within the guest memory structures for particular identifiers of types of guest operating system instrumentation information and associating data corresponding with the particular identifiers with the guest operating system instrumentation information.

Figure 6:
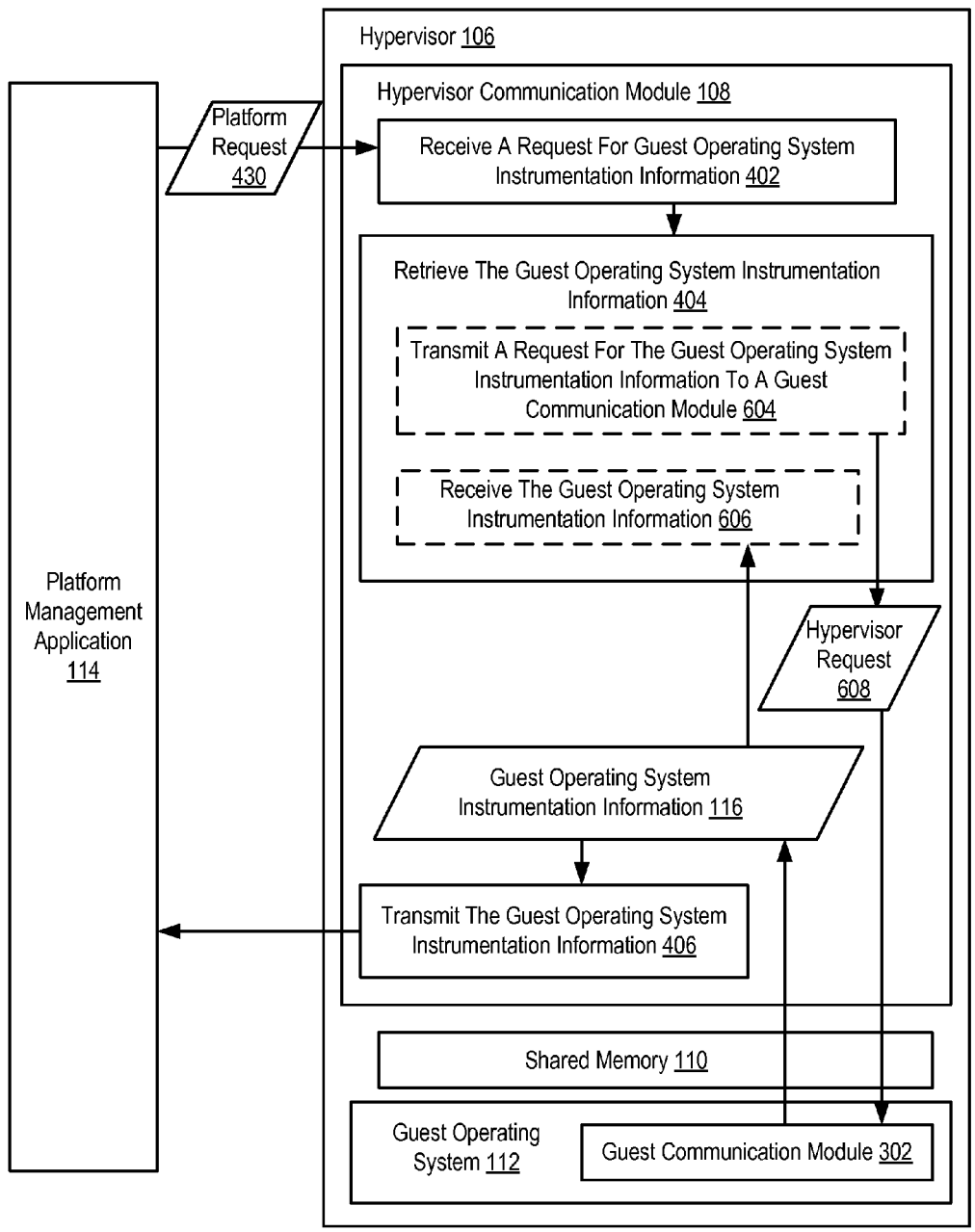
FIG. 6 sets forth a flow chart illustrating a further example of a method for acquiring guest operating system instrumentation information in a hypervisor according to embodiments of the present invention.

For further explanation, FIG. 6 sets forth a flow chart illustrating a further example of a method for acquiring guest operating system instrumentation information in a hypervisor according to embodiments of the present invention. The method of FIG. 6 includes the following elements of the method of FIG. 4: receiving (402) from a platform management application (114), by a hypervisor communication module (108) of a hypervisor (106), a platform request (430) for guest operating system instrumentation information (116) associated with at least one guest operating system (112) executing within the hypervisor (106); and in response to receiving (402) the platform request (430) for the guest operating system instrumentation information (116), retrieving (404) through shared memory (110) between the hypervisor (106) and the guest operating system (112), by the hypervisor communication module (108), the guest operating system instrumentation information (116) associated with the at least one guest operating system (112).

The elements of FIG. 6 that differ from the method of FIG. 4 are illustrated in FIG. 6 with a dashed line. More particularly, those elements include: transmitting (604) through shared memory (110), by the hypervisor communication module (108) to a guest communication module (302) within the at least one guest operating system (112), a hypervisor request (608) for the guest operating system instrumentation information (116); and receiving (606), through the shared memory (110) from the guest communication module (302), by the hypervisor communication module (108), the guest operating system instrumentation information (116).

In the method of FIG. 6, retrieving (404) the guest operating system instrumentation information (116) includes transmitting (604) through shared memory (110), by the hypervisor communication module (108) to a guest communication module (302) within the at least one guest operating system (112), a hypervisor request (608) for the guest operating system instrumentation information (116). Transmitting (604) the hypervisor request (608) may be carried out by establishing communication with the guest operating system (112) using a login terminal of the guest operating system (112); transmitting a command from the hypervisor communication module (108) to the guest communication module (302); executing a program on the guest communication module (302); responsive to the command, install software components on the guest communication module (302); and gathering guest operating system instrumentation information at the guest communication module (302).

In the method of FIG. 6, retrieving (404) the guest operating system instrumentation information (116) includes receiving (606), through the shared memory (110) from the guest communication module (302), by the hypervisor communication module (108), the guest operating system instrumentation information (116). Receiving (606) the guest operating system instrumentation information (116) may be carried out by gathering at the guest communication module (302) the guest operating system instrumentation information; transmitting the guest operating system instrumentation information; and translating the guest operating system instrumentation information.

Example embodiments of the present invention are described largely in the context of a fully functional computer system for acquiring guest operating system instrumentation information in a hypervisor. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the example embodiments described in this specification are oriented to software installed and executing on computer hardware, nevertheless, alternative embodiments implemented as firmware or as hardware are well within the scope of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operating of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method for acquiring guest operating system instrumentation information in a hypervisor, the method comprising:

receiving, by a hypervisor communication module of the hypervisor, a platform request for guest operating system instrumentation information associated with at least one guest operating system executing within the hypervisor, the platform request originating from a remote platform management application;

in response to receiving the platform request for the guest operating system instrumentation information, retrieving through shared memory between the hypervisor and the guest operating system, by the hypervisor communication module, the guest operating system instrumentation information associated with the at least one guest operating system, wherein retrieving the guest operating system instrumentation information associated with the at least one guest operating system includes traversing in a read-only mode, by the hypervisor communication module, guest memory structures associated with the at least one guest operating system and parsing the guest memory structures to identify the guest operating system instrumentation information, including using a rules engine to determine a location of the guest operating system instrumentation information within the guest memory structures; and transmitting, by the hypervisor communication module, the guest operating system instrumentation information to the remote platform management application.

2. The method of claim 1, wherein the guest operating system instrumentation information is located in predetermined locations within the guest memory structures.

3. The method of claim 1, wherein retrieving the guest operating system instrumentation information associated with the at least one guest operating system includes:

transmitting through the shared memory, by the hypervisor communication module to a guest communication module within the at least one guest operating system, a hypervisor request for the guest operating system instrumentation information; and receiving, through the shared memory from the guest communication module, by the hypervisor communication module, the guest operating system instrumentation information.

4. The method of claim 1, wherein the hypervisor communication module retrieves and transmits guest operating system instrumentation information associated with each guest operating system in the hypervisor in response to a single platform request from the platform management application.

5. The method of claim 1, wherein the guest operating system instrumentation information includes resource usage, significant events, running processes, and configuration changes of the at least one guest operating system.

6. An apparatus for acquiring guest operating system instrumentation information in a hypervisor, the apparatus having a computer processor, a computer memory operatively coupled to the computer processor, the computer memory having disposed within it computer program instructions that when executed by the computer processor cause the computer processor to:

receive, by a hypervisor communication module of the hypervisor, a platform request for guest operating system instrumentation information associated with at least one guest operating system executing within the hypervisor, the platform request originating from a remote platform management application;

in response to receiving the platform request for the guest operating system instrumentation information, retrieve through shared memory between the hypervisor and the guest operating system, by the hypervisor communication module, the guest operating system instrumentation information associated with the at least one guest operating system, wherein the computer processor retrieving the guest operating system instrumentation information associated with the at least one guest operating system includes the computer processor traversing in a read-only mode, by the hypervisor communication module, guest memory structures associated with the at least one guest operating system and parsing the guest memory structures to identify the guest operating system instrumentation information, including using a rules engine to determine a location of the guest operating system instrumentation information within the guest memory structures; and transmit, by the hypervisor communication module, the guest operating system instrumentation information to the remote platform management application.

7. The apparatus of claim 6, wherein the guest operating system instrumentation information is located in predetermined locations within the guest memory structures.

8. The apparatus of claim 6, wherein the computer program instructions that when executed by the computer processor cause the computer processor to retrieve the guest operating system instrumentation information associated with the at least one guest operating system includes computer program instructions that when executed by the computer processor cause the computer processor to:

transmit through the shared memory, by the hypervisor communication module to a guest communication module within the at least one guest operating system, a hypervisor request for the guest operating system instrumentation information; and receive, through the shared memory from the guest communication module, by the hypervisor communication module, the guest operating system instrumentation information.

9. The apparatus of claim 6, wherein the hypervisor communication module retrieves and transmits guest operating system instrumentation information associated with each guest operating system in the hypervisor in response to a single platform request from the platform management application.

10. The apparatus of claim 6, wherein the guest operating system instrumentation information includes resource usage, significant events, running processes, and configuration changes of the at least one guest operating system.

11. A compute program product for acquiring guest operating system instrumentation information in a hypervisor, the computer program product comprising:

a computer readable storage medium having computer readable program code embodied therewith, wherein the computer readable storage medium is not a signal, the computer readable program code comprising:

computer readable program code configured to:

receive, by a hypervisor communication module of the hypervisor, a platform request for guest operating system instrumentation information associated with at least one guest operating system executing within the hypervisor, the platform request originating from a remote platform management application;

in response to receiving the platform request for the guest operating system instrumentation information, retrieve through shared memory between the hypervisor and the guest operating system, by the hypervisor communication module, the guest operating system instrumentation information associated with the at least one guest operating system, wherein the retrieving the guest operating system instrumentation information associated with the at least one guest operating system includes traversing in a read-only mode, by the hypervisor communication module, guest memory structures associated with the at least one guest operating system and parsing the guest memory structures to identify the guest operating system instrumentation information, includes using a rules engine to determine a location of the guest operating system instrumentation information within the guest memory structures; and transmit, by the hypervisor communication module, the guest operating system instrumentation information to the remote platform management application.

12. The computer program product of claim 11, wherein the guest operating system instrumentation information is located in predetermined locations within the guest memory structures.

13. The computer program product of claim 11, wherein the computer readable code configured to retrieve the guest operating system instrumentation information associated with the at least one guest operating system includes computer readable code configured to:
   transmit through the shared memory, by the hypervisor communication module to a guest communication module within the at least one guest operating system, a hypervisor request for the guest operating system instrumentation information; and
   receive, through the shared memory from the guest communication module, by the hypervisor communication module, the guest operating system instrumentation information.

14. The computer program product of claim 11, wherein the hypervisor communication module retrieves and transmits guest operating system instrumentation information associated with each guest operating system in the hypervisor in response to a single platform request from the platform management application.

* * * * *